United States Patent Office 3,276,849
Patented Oct. 4, 1966

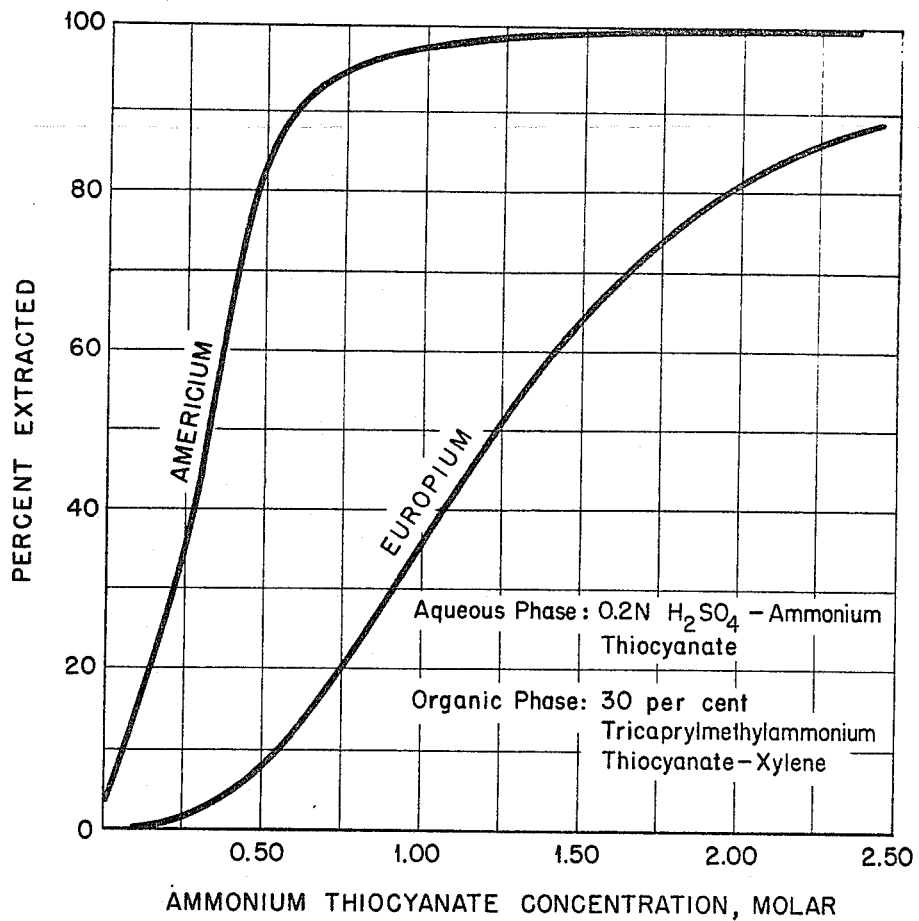

3,276,849
METHOD FOR SEPARATING MEMBERS OF ACTINIDE AND LANTHANIDE GROUPS
Fletcher L. Moore, Knoxville, Tenn., assignor to the United States of America as represented by the United States Atomic Energy Commission
Filed Sept. 18, 1964, Ser. No. 397,664
16 Claims. (Cl. 23—340)

The invention described herein was made in the course of, or under, a contract with the United States Atomic Energy Commission.

My invention relates to methods for processing neutron-irradiated fissile materials, and more particularly to methods for separating elements of the lanthanide and actinide groups from each other.

Solvent extraction processes are especially useful in separating highly radioactive elements from each other and from non-radioactive elements and such processes have been developed for separating actinides from lanthanides. For a description of one of these processes, see my co-pending application, Serial No. 71,846, filed November 25, 1960, now Patent No. 3,178,256, issued April 13, 1965, for "Method for Separating Transplutonium Elements From Rare Earth Fission Products." Although the method of this co-pending application is useful in separating trivalent actinides from the lanthanides, it requires the presence of a high concentration of lithium chloride. The corrosive nature of the chloride results in high equipment costs, and methods not requiring chloride are desirable. Furthermore, in the case of high alpha activity the presence of lithium presents a neutron hazard in view of the possibility of an $\alpha, n$ reaction.

It is accordingly one object of my invention to provide an improved solvent extraction process for separating actinides from the lanthanides.

It is another object to provide such a process which does not require the use of chloride-containing solutions.

It is another object to provide such a process which does not require the use of lithium values.

Other objects will become apparent from the following description and claims.

I have discovered that quaternary ammonium compounds in the presence of thiocyanate values preferentially extract actinide values from lanthanide values and that these compounds show selectivity for extraction of elements within these groups. In accordance with my discovery I have provided a method for separating metal values selected from the group consisting of actinide and lanthanide values from an aqueous solution containing said values comprising the steps of:

(a) Contacting said aqueous solution with an organic solution of a quaternary ammonium compound, said contact being made in the presence of thiocyanate values in a concentration sufficient to transfer metal values selected from said actinide and lanthanide values into said organic solution; and (b) Separating the resulting metal value-containing organic solution from the resulting aqueous phase.

My process is useful in separating any metal value of the actinide and lanthanide groups from other metal values of these groups. By the term "actinide" I mean elements having atomic numbers 89 through 103 and by the term "lanthanide" I intend to include yttrium as well as the elements having atomic numbers from 57 through 71. My process is especially useful in separating the transplutonium elements from the lanthanides. Inasmuch as the actinides thorium, protactinium, uranium, neptunium, and plutonium are readily oxidized, other methods are readily available for their separation. If desired, however, my process may be used to separate these elements as well as transplutonium values from lanthanides.

My process has many advantages over previous methods of separating trivalent actinides from lanthanides including: (1) the highest single stage separation factors found to date are reached; e.g., the separation factor for californium/lanthanum is 9800 at 0.2 normal sulfuric acid; (2) higher solubilities of lanthanides and actinides are possible in the aqueous solution of my process than in a concentrated lithium chloride solution; (3) equilibrium is reached rapidly; (4) the solutions are relatively non-corrosive; (5) the aqueous solutions of my process have a low viscosity compared to solutions of concentrated lithium chloride; and (6) the neutron hazard existing in systems using lithium chloride in the presence of large amounts of alpha emitters has been eliminated.

The figure shows the relationship between the extraction coefficients for americium and europium and the concentration of thiocyanate in the aqueous phase.

In the first step of my process an aqueous solution containing a mixture of metal values to be separated is contacted with an organic solution of a quaternary ammonium compound in the presence of thiocyanate values. While my process will work if the thiocyanate values are provided in just one phase, which may be either the aqueous or the organic phase, in the preferred embodiment of my process thiocyanate values are initially present in both phases, and my invention is described in detail in accordance with this preferred procedure.

In accordance with this preferred procedure the aqueous solution to be contacted with the organic solution is provided with thiocyanate values. These values may be provided in the form of any water-soluble salt. In view of their high solubility and the fact that the metal component does not extract into the organic phase, the alkali metal thiocyanates such as sodium and potassium thiocyanate are the most suitable compounds. Ammonium thiocyanate is preferred in cases where a minimum solids content is desirable. The concentration of thiocyanate must be at least 0.1 molar, and, while my process is operable even at thiocyanate concentrations in excess of 3 molar, the separation factor starts to decrease with no compensating advantages as the concentration of this reagent exceeds about 1.25 molar. The concentration of thiocyanate is preferably in the range of 0.25 to 1.5 molar, and the optimum concentration is about 0.5 to 0.8 molar.

My process is operable with acidic aqueous solutions having a pH as high as 5. I have found that a low concentration of acid unexpectedly improves the separation of actinides from lanthanides. In addition to improving the separation factor, the acid prevents hydrolysis of some metal ions which otherwise may precipitate and interfere with the extraction. Acid concentrations as great as about 0.6 normal may be used, but the separation factor decreases as the concentration of acid exceeds about 0.2 normal. The preferred concentration of acid is in the range of 0.1 to 0.3 normal. A wide variety of acids, both organic and inorganic, may be used. Typical useful acids are hydrochloric, nitric, acetic, tartaric, and citric, and sulfuric acid is preferred.

The organic phase brought into contact with the aqueous phase comprises a quaternary ammonium thiocyanate in a diluent. Any quaternary ammonium compound having high organic and low aqueous solubility may be used in my process and these conditions are met by compounds containing from 17 to 49 carbon atoms. The compound may be represented by the formula

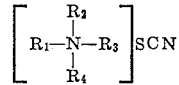

where $R_1$, $R_2$, $R_3$ and $R_4$ are selected from the group consisting of aryl and alkyl radicals. These radicals may contain substituents which do not increase the water solubility of the compound to an appreciable degree. The preferred compounds are those wherein the radicals are saturated hydrocarbons at least three of which contain at least 5 carbon atoms each. Typical examples of these are tetra-n-hexyl ammonium thiocyanate and tetra-n-heptyl ammonium thiocyanate. The compounds wherein three of the radicals are saturated hydrocarbon chains containing from 8 to 10 carbon atoms each and the remaining radical is a methyl group are particularly useful.

Any organic compound which will dissolve the quaternary ammonium compound and not form interfering complexes may be used as a diluent. Typically useful diluents are the aromatic solvents such as xylene, toluene, benzene, and diethylbenzene; the aliphatic hydrocarbons such as kerosene; the ketones such as methylisobutyl ketones and diisobutyl ketones; and alcohols such as diisobutyl carbinol.

The concentration of the quaternary ammonium compound in the organic phase may suitably range from 50 to 400 grams per liter, and is preferably in the range of 200 to 300 grams per liter.

If, in carrying out my process, thiocyanate values are initially provided in only one phase, the concentration of thiocyanate in that phase should be in the upper range of the concentrations recited above.

The organic phase, containing extracted metal values, is separated from the aqueous phase and this may be accomplished by any suitable means.

If desired, the extracted values may be removed from the separated organic phase. If it is desired to provide an aqueous solution of the extracted metal values, these values may be stripped into substantially pure water or into an acidic solution. Typically useful acids are hydrochloric and sulfuric, and a wide range of concentrations may be used, contact with from 1 normal to 6 normal acid effecting virtually complete removal of extracted metal values in one stage.

Having thus described my invention the following examples are offered to illustrate it in more detail.

*Example I*

An organic solution of tricaprylmethyl ammonium thiocyanate was formed by contacting a 30 percent tricaprylmethyl ammonium chloride—70 percent xylene solution with an equal volume of an aqueous solution 6 molar in sodium thiocyanate. The resulting organic solution of tricaprylmethyl ammonium thiocyanate was contacted with an equal volume of 1 normal sulfuric acid. Portions of this acidified organic phase were contacted with equal volumes of aqueous solutions containing americium and europium, various concentrations of ammonium thiocyanate, and 0.2 normal in $H_2SO_4$. Contact was made for two minutes, the liquid phases were separated, and the separated phases were analyzed for americium and europium. The resulting data are given in the figure. As can be seen from the figure excellent separation of americium from europium is achieved even in only one stage.

It may be noted that the step of contacting the organic phase with acid is optional, and has the effect of reducing or eliminating the removal of free acid from the aqueous phase during the extraction step.

*Example II*

Using tricaprylmethyl ammonium thiocyanate-xylene extractant as prepared in Example I, single stage extractions of typical trivalent actinides and lanthanides were made from aqueous solutions 0.6 molar in ammonium thiocyanate, 0.1 normal and 0.2 normal in sulfuric acid, and containing tracer quantities of one element from these groups. Analyses were made of the element under consideration in each of the phases. The resulting data are given in Table I.

TABLE I.—EXTRACTION OF TRIVALENT ACTINIDE AND LANTHANIDE ELEMENTS

| Element | Percent Extracted | |
|---|---|---|
| | 0.1 N $H_2SO_4$ | 0.2 N $H_2SO_4$ |
| Lanthanum-140 | 3.1 | <1.0 |
| Cerium-144 | 6.3 | 1.4 |
| Promethium-148 | 24.6 | 5.9 |
| Europium-152-4 | 30.7 | 7.6 |
| Yttrium-91 | 13.4 | 3.8 |
| Thulium-170 | 73.4 | 49.9 |
| Ytterbium-175 | 87.7 | 73.2 |
| Americium-241 | 99.9 | 91.4 |
| Curium-244 | >98.8 | 90.9 |
| Berkelium-249 | >99.0 | 96.0 |
| Californium-252 | 99.0 | 98.0 |

As can be seen from the above data, even adjacent elements of the rare earths have sufficiently different extraction values to permit their separation, although in some instances several extraction stages would be necessary to achieve a high degree of separation.

*Example III*

Tricaprylmethyl ammonium thiocyanate-xylene extractant as prepared in Example I was contacted with an equal volume of an aqueous solution 0.06 normal in nitric acid and containing americium and europium. There was initially no thiocyanate in the aqueous phase. 76 percent of the americium and 4 percent of the europium were extracted into the organic phase.

This example illustrates a method of carrying out my process wherein thiocyanate is initially present in only one phase.

*Example IV*

An aqueous solution 0.6 molar in ammonium thiocyanate, 0.1 normal in $H_2SO_4$, and containing the trivalent actinides $^{241}Am$, $^{244}Cm$, and $^{252}Cf$, together with the lanthanides $^{144}Ce$, $^{148}Pm$, $^{152-4}Eu$, and $^{91}Y$ was contacted with an equal volume of tricaprylmethyl ammonium thiocyanate-xylene solution. The phases were separated, and the separated aqueous phase was again contacted with fresh extractant. Analyses were made of the organic and aqueous phases and the resulting data are given in Table II.

TABLE II.—SEPARATION OF TRIVALENT ACTINIDES FROM LANTHANIDES

| Extractant | Number of Extractions | Percent Extracted | |
|---|---|---|---|
| | | Actinides | Lanthanides |
| 20% tricaprylmethyl ammonium thiocyanate-xylene | 2 | 93.6 | 3.1 |
| Do | 3 | 99.3 | 5.2 |
| 30% tricaprylmethyl ammonium thiocyanate-xylene | 2 | 7.9 | 5.1 |

The above examples are intended to illustrate and not limit my invention. It is clear that variations may be made in the process and still be within the scope of my invention. For instance, not only may actinides be separated from lanthanides, but, in view of the different degrees of extractability of the various elements, actinides may be separated from each other, and lanthanides may be separated from each other. It is also clear that variations may be made in the compositions of either or both the organic and aqueous solutions.

What is claimed is:
1. A method of separating metal values selected from the group consisting of actinide and lanthanide values from an acidic aqueous solution containing said values comprising the steps of:
 (a) contacting said aqueous solution with an organic solution of a quaternary ammonium compound, said contact being made in the presence of sufficient thiocyanate values to make said aqueous phase at least 0.1 molar in thiocyanate thereby transferring metal values selected from the actinide and lanthanide groups into said organic solution; and
(b) separating the resulting metal value-containing organic solution from the resulting aqueous phase.

2. A method of separating metal values selected from the group consisting of trivalent actinide and lanthanide values from an acidic aqueous solution containing said values comprising the steps of:
(a) providing said aqueous solution with thiocyanate values in a concentration of at least 0.1 molar;
(b) contacting the resulting aqueous thiocyanate solution with a substantially water-immiscible organic extractant comprising an organic diluent and a quaternary ammonium thiocyanate having the formula

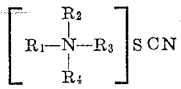

where $R_1$, $R_2$, $R_3$ and $R_4$ represent radicals selected from the group consisting of alkyl and aryl radicals; and
(c) separating the resulting metal value-containing organic phase from the resulting aqueous phase.

3. The method of claim 2 wherein the concentration of thiocyanate in the aqueous phase is in the range of 0.25 to 1.5 molar.

4. The method of claim 3 wherein the quaternary ammonium thiocyanate contains from 17 to 49 carbon atoms.

5. The method of claim 3 wherein the quaternary ammonium thiocyanate is tricaprylmethyl ammonium thiocyanate.

6. The method of claim 3 wherein the aqueous phase is 0.1 to 0.3 normal in acid.

7. The method of claim 3 wherein the aqueous phase is 0.1 to 0.3 normal in sulfuric acid.

8. A method of separating trivalent actinide values from an acidic aqueous solution containing said values together with lanthanide values comprising the steps of:
(a) providing said solution with ammonium thiocyanate in a concentration in the range of 0.25 to 1.5 molar;
(b) contacting the resulting aqueous ammonium thiocyanate solution with a substantially water-immiscible organic extractant comprising an organic diluent and a quaternary ammonium thiocyanate having the formula

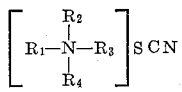

where $R_1$, $R_2$, $R_3$ and $R_4$ represent radicals selected from the group consisting of alkyl and aryl radicals; and
(c) separating the resulting metal value-containing organic phase from the resulting aqueous phase.

9. The method of claim 8 wherein ammonium thiocyanate is provided in the aqueous solution in a concentration of 0.5 to 0.8 molar.

10. The method of claim 8 wherein the quaternary ammonium thiocyanate contains from 17 to 49 carbon atoms.

11. The method of claim 8 wherein at least three of said radicals contain at least 5 carbon atoms each.

12. The method of claim 8 wherein three of said radicals contain from 8 to 10 carbon atoms each and the other of said radicals is a methyl group.

13. The method of claim 8 wherein the quaternary ammonium thiocyanate is tricaprylmethyl ammonium thiocyanate.

14. The method of claim 8 wherein at least one metal selected from the group consisting of americium, curium, berkelium, and californium values are separated from at least one of the lanthanide elements.

15. The method of claim 8 wherein the aqueous solution is provided with sulfuric acid in a concentration of 0.1 to 0.3 normal.

16. A method of separating members of the lathanide group from each other comprising the steps of:
(a) forming an aqueous solution of a mixture of said lanthanides;
(b) making said solution 0.1 to 3.0 molar in ammonium thiocyanate and 0.1 to 0.3 normal in sulfuric acid;
(c) contacting the resulting acidic ammonium thiocyanate solution with a substantially water-immiscible organic extractant comprising an organic diluent and a quaternary ammonium thiocyanate having the formula

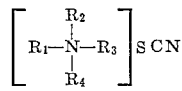

where $R_1$, $R_2$, $R_3$ and $R_4$ represent radicals selected from the group consisting of alkyl and aryl radicals; and
(d) separating the resulting lanthanide value-containing organic phase from the resulting aqueous phase.

References Cited by the Examiner

UNITED STATES PATENTS 3,223,476  12/1965  Hart _____ 23—14.5

OTHER REFERENCES

Oka et al: Solvent Extraction of Radio-Ruthenium as the Thiocyanate Complex—Nuclear Science Abstracts, vol. 17, No. 16, Abstract No. 27460.

BENJAMIN R. PADGETT, *Primary Examiner.*

S. TRAUB, *Assistant Examiner.*